(No Model.)

J. D. MILBURN.
Metal Pulley.

No. 241,048. Patented May 3, 1881.

Witnesses:
Jas. E. Hutchinson
J. A. Rutherford

Inventor.
John D. Milburn,
By James L. Norris,
Atty.

N. PETERS, Photo-Lithographer, Washington, D. C.

UNITED STATES PATENT OFFICE.

JOHN D. MILBURN, OF MEMPHIS, TENNESSEE.

METAL PULLEY.

SPECIFICATION forming part of Letters Patent No. 241,048, dated May 3, 1881.

Application filed April 6, 1881. (No model.)

*To all whom it may concern:*

Be it known that I, JOHN D. MILBURN, a citizen of the United States, residing at Memphis, in the county of Shelby and State of Tennessee, have invented new and useful Improvements in Metal Pulleys, of which the following is a specification.

My invention relates to that class of pulleys having cast-iron spokes and wrought-iron rims, its object being to strengthen and preserve the circular shape of the rim, to facilitate the placing of a belt upon a pulley in motion, and to prevent the cutting of an unshipped belt by the edge of a pulley-rim.

To these ends it consists in a metal pulley having a cast-iron hub and spokes, provided with a wrought-iron rim, flanged inwardly at its edges.

Figure 1:
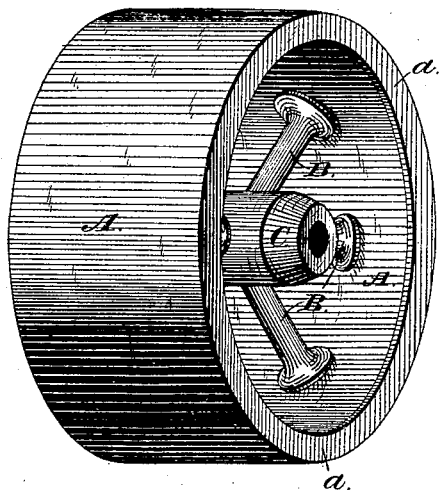
Figure 2:
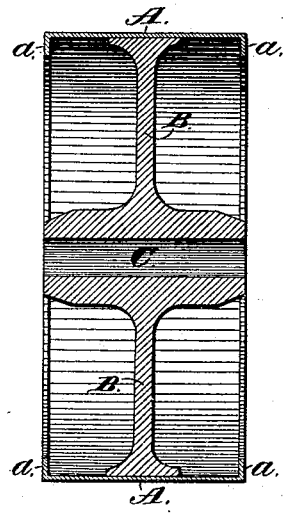
Figure 3:
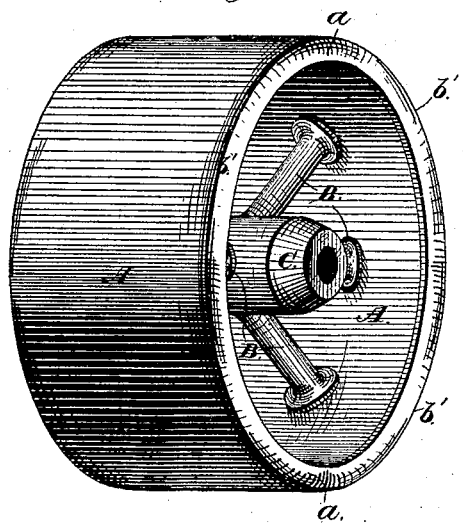

In the accompanying drawings, Figure 1 is a perspective view of a pulley illustrated according to my invention. Fig. 2 is a diametric section of the same. Fig. 3 is a perspective view, illustrating a modification of the pulley; and Fig. 4, a diametric section of the same.

The letter A denotes the rim of the pulley, having flanges $a$ turned inwardly toward the center. These flanges strengthen the rim against the centrifugal strain, which tends to force it away from the ends of the spokes, and destroy its true circular shape. The flanges also serve as guides in slipping a loose belt upon the pulley in motion, and prevent the edge of the belt from being cut by the rim-edge when the belt is off and hanging loose, or while it is being placed upon the pulley.

Figure 4:
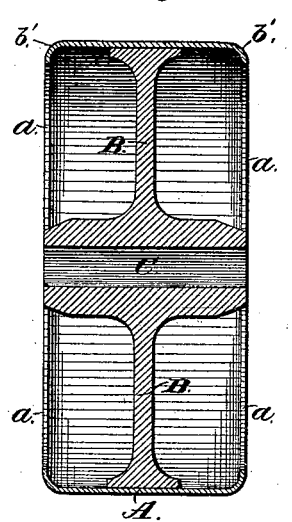

In the modification shown in Figs. 3 and 4 I curve the margins of the rim inwardly, as at $b'$, to form the flanges, and thus avoid the sharp corner which might cut the belt. These rounded flanges also render it easier to slip the belt upon the pulley in motion, and especially wear and cutting of the belt in shifting it on and off fast and loose pulleys.

The spokes B and hub C are made of cast metal, and directly upon the ends of the spokes is arranged and permanently connected, by screws, bolts, or riveting, the wrought-iron rim or tread, said rim having its edges bent or curved inwardly, which, as aforesaid, not only enables the belt to be shifted with ease and facility, but also imparts great strength to the rim.

Having thus described my invention, what I claim, and desire to secure by Letters Patent, is—

As an improved article of manufacture, a belt-pulley having its hub and spokes formed of cast metal, with the wrought-iron rim having inwardly-turned edges and connected directly with the ends of the cast-metal spokes, substantially as shown and described.

In testimony whereof I have hereunto set my hand in the presence of two subscribing witnesses.

JOHN D. MILBURN.

Witnesses:
L. E. POPE,
THOS. T. TAYLOR.